Oct. 26, 1948.  R. T. DAWES ET AL  2,452,228
ELASTIC PARACHUTE SHROUD AND METHOD OF MAKING IT
Filed March 25, 1947  3 Sheets-Sheet 1
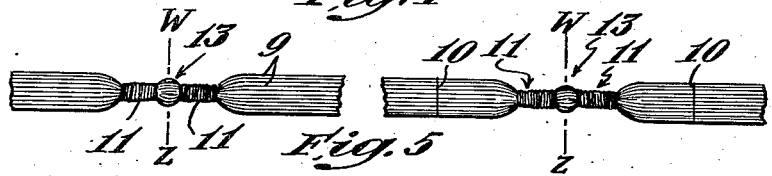
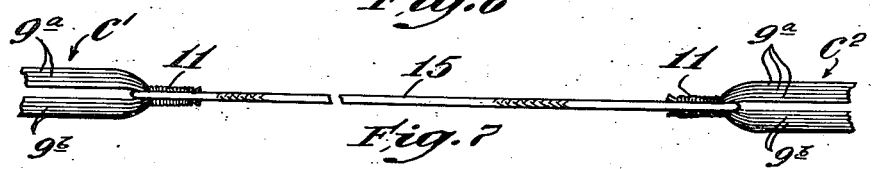
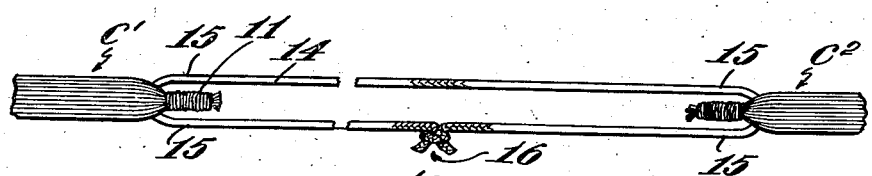
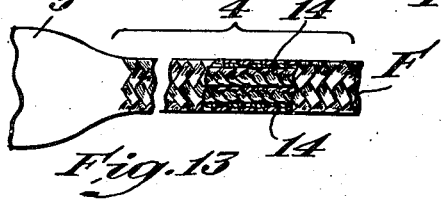
Inventors
Frank Taylor
Robert T. Dawes
by Roberts Cushman & Crowe
Att'ys.

Patented Oct. 26, 1948

UNITED STATES PATENT OFFICE 2,452,228

ELASTIC PARACHUTE SHROUD AND METHOD OF MAKING IT

Robert T. Dawes and Frank Taylor, Hudson, Mass.

Application March 25, 1947, Serial No. 737,077

29 Claims. (Cl. 87—2)

This invention pertains to parachute shrouds and more particularly to shrouds which are elastically stretchable.

The shrouds which suspend the aviator from the parachute canopy have customarily been made from silk or other strong textile fiber. While such shrouds have the requisite strength, they are incapable of substantial elastic elongation when subjected to a suddenly applied load. For this reason it has been found unsafe for aviators to jump from planes travelling more than 125 miles per hour, for beyond this speed the sudden shock resultant from the opening of the parachute canopy is so great as seriously to injure or even to kill the aviator or to burst the canopy; even at lesser speeds the shock is heavy and exceedingly unpleasant for the aviator.

It has heretofore been proposed to employ elastically stretchable shrouds capable of substantial elastic elongation, for example 100% or more when subjected to a suddenly applied load, thus distributing the application of the decelerating force over a substantial interval of time and relieving the aviator from too sudden and severe a shock. Elastically stretchable shrouds have further advantages—among them the substantial elimination of oscillation of the canopy after opening, so that the aviator drops in a substantially vertical position and is thus ideally situated for landing; the cushioning of the impact of landing and the quick collapse of the canopy in landing, while steering of the descending parachute may be accomplished with less danger of entanglement of the aviator in the shrouds.

While elastically stretchable shrouds have the above advantages (at least from the theoretical standpoint) and while properly constructed shrouds actually do possess these advantages in use, it has been found that for best results the shrouds must have certain distinguishing structural characteristics and should be prepared in accordance with certain definite procedural steps.

At the present stage of rubber technique there are advantages in using a plurality or bundle of rubber threads instead of a single rubber strand to constitute the elastic core of the shroud, but it is contemplated as within the scope of the present invention to use a single rubber core strand, providing a single strand of the desired strength and having the requisite elastic qualities and durability can be obtained. Experiment has shown that when such a multi-thread elastic core is carefully made, the shroud functions as intended, but that unless care be exercised in preparing the core, its constituent rubber threads may not be equally loaded when in use and that in consequence, upon the sudden application of maximum load resultant from the opening of the parachute, only a fraction of the threads may be fully stretched. Thus some of the threads may be overloaded, and the threads begin to break one after the other, until the entire shroud fails at much less than the calculated load. Moreover, unless the textile casing is capable of substantial elastic elongation, in addition to its capability for a limited and definite structural elongation, the casing may be overloaded and ruptured.

One object of the present invention is to provide a parachute shroud which is capable of elastic stretch to a very substantial extent, for example two hundred per cent or more and which is reliable and long lived, and having a safety factor such that it is capable of sustaining great and suddenly applied loads without danger of failure. A further object is to provide an elastically stretchable parachute shroud comprising a core bundle of parallel rubber threads so arranged that the constituent threads of the core are loaded substantially uniformly when the core is subjected to loading stress. A further object is to provide an elastically stretchable parachute shroud comprising a core bundle of parallel threads and a braided casing or jacket, the latter being capable of substantial elastic elongation when subjected to a sufficient longitudinal stress. A further object is to provide a parachute shroud including a rubber elastic core and a braided casing, and wherein the core is elongated, even when the shroud is at rest (that is to say unloaded) but is capable of further extension, at least as great and preferably far greater than that of the casing. A further object is to provide a parachute shroud including a rubber elastic core and a braided casing and wherein the core is held under low tension and permanently elongated for example, to approximately double its initial length, when the shroud is unloaded, by the grip of the casing. A further object is to provide an elastically stretchable parachute shroud of the kind in which rubber threads form a core within an elastically stretchable braided casing and having relatively inelastic terminal portions for connection with the canopy and harness respectively, and with provision for anchoring these terminal portions so firmly to the rubber core of the shroud as to avoid any danger of their separation therefrom. A further object is to provide a simple and positive connection between the core and casing without resort to the provision, by special braiding operations, or the like, of points of seizure between the casing and core. A further object is to provide a novel method of making rubber elastic parachute shrouds having the characteristics above noted. Other and further objects and advantages of the invention will be pointed out in the following more detailed description and by reference to the accompanying drawings wherein Fig. 1 is a fragmentary plan view of a parachute shroud made in accordance with the present invention;

Fig. 2 is a fragmentary plan view of an assembly of rubber-elastic threads designed to form the core of the shroud;

Fig. 3 is a view similar to Fig. 2 but showing the rubber-elastic threads tensioned in preparation for the next step in the operation of making the core;

Fig. 4 is a view showing the rubber-elastic threads with end bindings applied, the threads still being under tension;

Fig. 5 is a view showing the threads with their end bindings as they appear after the tension has been released;

Fig. 6 is a fragmentary plan view of a completed rubber-elastic core;

Figs. 7 and 8 are a side elevation and plan view respectively showing a preferred mode of connecting two adjacent rubber-elastic cores;

Figure 11:
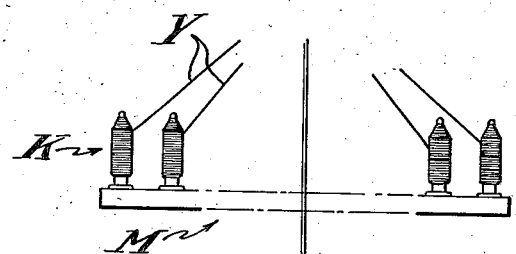
Fig. 11 is a fragmentary diagrammatic side elevation of a braiding machine illustrating means for delivering the united rubber-elastic cores under predetermined uniform tension to the braiding point.
Figure 12:
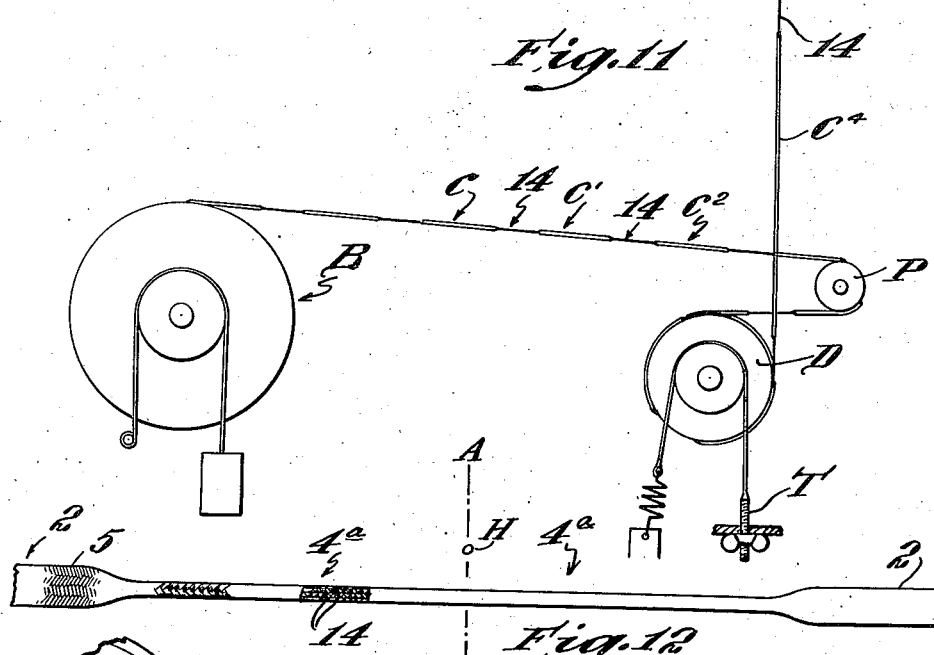
Figure 11A:
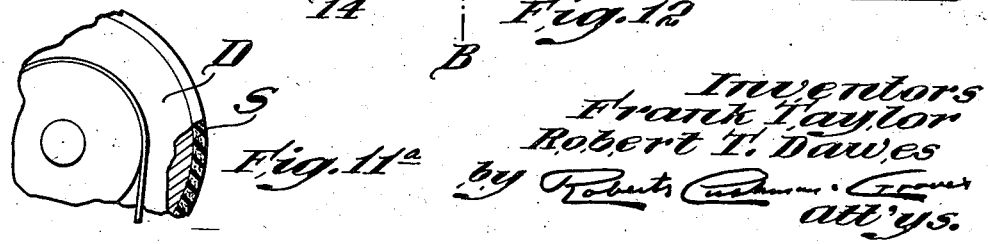
Figure 14:
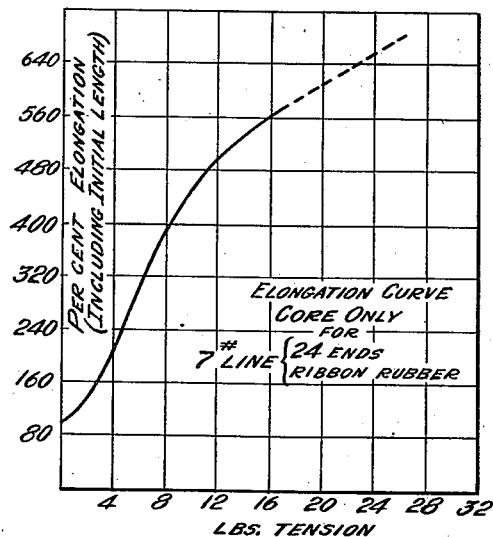
Figure 15:
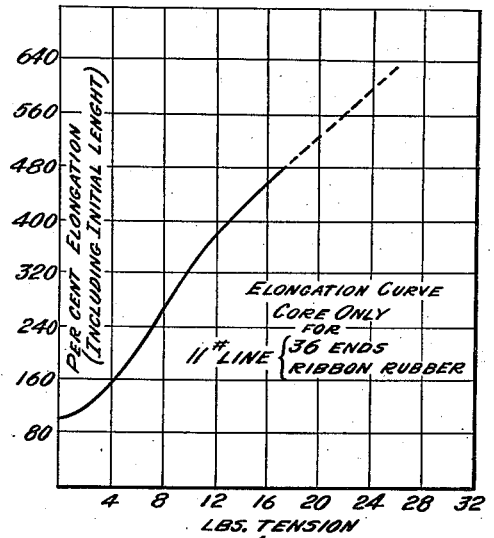
Figure 16:
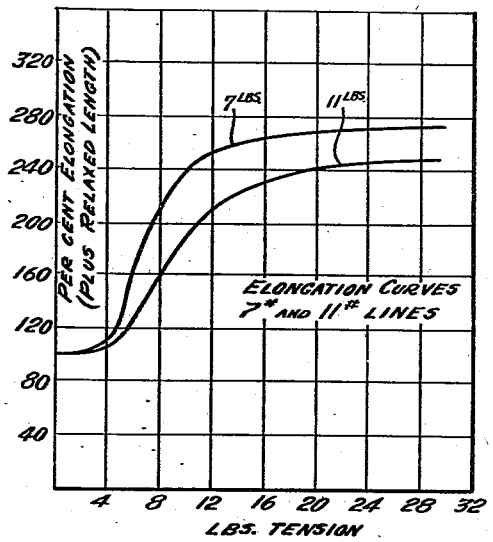

Fig. 11ª is a fragmentary side elevation to larger scale, of preferred type of tension drum;

Fig. 12 is a fragmentary side elevation showing adjacent cores and the connecting member encased in the braided jacket;

Fig. 13 is a fragmentary elevation, to larger scale and with parts broken away, showing one end of a completed parachute shroud;

Fig. 14 is a diagram showing the per cent elongation of a rubber-elastic core when subjected to increasing tension;

Fig. 15 is a view similar to Fig. 14 but indicating the per cent elongation of a stronger core; and Fig. 16 is a diagram graphically illustrating the per cent elongation of completed shrouds designed for supporting loads of 7 and 11 pounds respectively, when subjected to increasing load.

Referring to the drawings the numeral 1 designates a completed shroud made in accordance with the present invention, but with the central portion broken away to show the rubber-elastic core. This central portion 2 is the part which contains the rubber-elastic core and which is capable of high elongation when subjected to load. This elastic portion 2 may, for example, be approximately four yards long, but may vary in accordance with the characteristics of the rubber employed and the load to be supported, and it is to be understood that the length of the shroud may also be varied in accordance with the type of parachute and the use to which the parachute is to be put. The shroud 1 has the opposite terminal portions 3 and 4 each, for example of the order of twenty inches long, and which are relatively inextensible, as compared with the central part 2, although as hereinafter pointed out, the terminal or connecting portions 3 and 4 are capable of substantial elastic elongation. The central portion 2 comprises a braided jacket or casing 5 within which is the rubber-elastic core 6 hereinafter more fully described. The jacket 5 extends thoughout the length of the shroud, including the terminal portions 3 and 4.

As above noted, an essential to the successful employment of a rubber-elastic core in a parachute shroud is that each constituent thread of the core shall bear its proportionate share of the load, in other words that each individual core thread shall stretch to the same amount when subjected to the same load. While it is conceivable that with the improvements in rubber technology, a single strand core may be employed for this purpose, it is not known at the present time how to cure a single core strand of the requisite cross sectional dimensions to insure the necessary elasticity and length of life in service. Accordingly it is at present necessary to use a core consisting of a plurality of relatively small rubber threads.

In accordance with the present invention, and as illustrated in Fig. 2, core threads 9 are first disposed in parallel relation and in relaxed or untensioned condition. The number of these threads is sufficient to provide a core having the required load-carrying characteristics, for instance to sustain a riding load of seven pounds. Preferably the rubber-elastic threads are provided in the form of ribbon rubber such as described, for example, in the reissue patent to Shaw No. 20,977, dated January 10, 1930. The individual threads of ribbon rubber tend to stretch to the same degree when the ribbon rubber strand, as a unit, is tensioned. In order to make up the desired core, a number of strands of ribbon rubber may be requisite, but such strands may readily be laid in substantially exact parallel relation and may readily be loaded equally. While ribbon rubber is preferable, it is within the scope of the invention to employ individual rubber threads, but in the latter case, care must be taken in manipulating the bundle of threads that each thread be tensioned to the same amount. By carefully winding the requisite number of individual threads under very light tension on a beam it is possible to arrange them so that they may be drawn off in parallel relation and with almost exactly the same tension.

Reverting to Fig. 2 where the threads 9 are shown as constituent elements of ribbon rubber, the ribbon strands are, as above described, laid parallel and preferably they are marked with transverse markings 10 at regular intervals, for example at intervals of 2 inches apart.

The core-forming rubber threads are now subjected to tension, as indicated by the arrows A and B (Fig. 3), until the marks 10 are spaced, for example four inches apart.

At suitable distances apart, longitudinally of the tensioned rubber-elastic threads, pairs of bindings 11 are applied. Each of these bindings 11 preferably consists of a rubber thread wound under high tension so as to compress the bundle of core threads 9 and firmly to bind the core threads together. The bindings 11 of each pair are spaced apart so that the distance between their adjacent ends 12 (before the rubber is permitted to contract) may, for example, be of the order of one-half inch. The pairs of bindings are spaced apart longitudinally of the rubber-core threads 9 a distance such that when the tension is released, adjacent pairs of bindings will be spaced approximately the desired length of the completed core (in its relaxed state) for a single parachute shroud.

Having applied these pairs of bindings 11, and allowed the rubber to relax, the rubber-elastic threads 9 are severed midway between the adjacent ends 12 of each pair of bindings, as indicated in Fig. 5, at the lines W—Z, the cutting taking place at 13 where the core threads are exposed between the adjacent ends of the bindings. The result of thus cutting the rubber threads is to produce a core C (Fig. 6) comprising parallel rubber threads 9, with a binding 11 at each end, and all of the same effective length.

Having provided cores as just described, two of such cores C¹ and C² (Figs. 7 and 8) are disposed with their end bindings 11 conveniently spaced apart and aligned. The rubber-elastic threads adjacent to each end binding are then separated into groups 9ª and 9ᵇ containing equal numbers of threads and a relatively inelastic connecting cord 14 is passed between these groups to form a loop whose parallel runs or legs 15 are disposed at diametrically opposite sides of the end binding 11. This connecting cord 14 may, for example, be a braided cord of suitable textile yarn, for instance cotton, silk or nylon. This cord is arranged to form loops about the end bindings 11 of the adjacent cores C¹ and C² respectively, and its ends are united by a knot at M (Fig. 8). The length of this double or two-ply connecting cord or strand may be, for example in the neighborhood of twenty inches (although this length may be varied, as desired) in order to provide the parachute shroud with a suitable terminal for attachment to the parachute canopy or to the load-supporting harness.

Figure 9:
Fig. 9 is a fragmentary side elevation showing the finish bindings at the ends of adjacent rubber-elastic cores.
Figure 10:
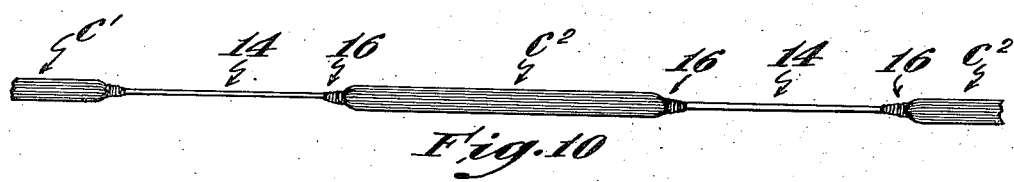
Fig. 10 is a side elevation showing a series of rubber-elastic cores connected by relatively inelastic connecting elements to form a strand for delivery to the braiding machine.

Having disposed the legs 15 of the loop of the cord 14, as above described, these legs are now firmly secured and anchored to the corresponding end binding 11 by a finishing wrapping 16 (Fig. 9) consisting of a highly tensioned rubber-elastic thread. The wrapping 16 embraces the legs 15 of the loop, constrictively binding them firmly to the end binding 11. The wrapping 16 extends beyond the end of the binding 11 and tapers in diameter, as indicated at 17, its smaller end embracing only the two-ply cord 14. This winding 16 forms a tapered end for the core and also insures a firm and fixed anchorage of the connecting cord 14 to the core.

Cores C¹, C², C³, etc., are thus successively united by the substantially inelastic connecting cords 14, as many of these cores being thus connected in series as may be desired. This series of connected cores (or core strand) may then be disposed in a box or other receptacle from which the strand is drawn off, or preferably this series or core strand is wound upon a beam B (Fig. 11) having provision for applying light tension as the strand is drawn off from the beam. This series of cores or core strand, after leaving the beam B, passes around a freely rotatable guide roll P, preferably having a peripheral groove for positioning the strand as it passes about the roll. From this roll P the strand passes to a tensioning drum D, rotation of which is opposed by a brake band having suitable means, indicated at T for adjusting it. Preferably, the peripheral surface of this drum D is covered with sponge rubber S (Fig. 11ª) so that in passing about this drum the irregular strand, comprising the relatively thick portions C, C¹, C², etc., and the relatively thin portions 14, will not slip relatively to the drum. Preferably the strand, comprising the conected cores, is wrapped approximately one and one-half turns about the drum D. From the drum D the strand passes directly up to the former or die of a braiding machine M which may be of conventional type and which has the carriers K for the textile yarns Y which form the jacket 5. During braiding, the operator observes the markings 10 on the core strands and adjusts the tensioning means from time to time as may be necessary to maintain a uniform spacing of the marks 10, thus insuring uniform elongation of the cores as they are delivered to the former of the braiding machine.

The tension imposed by the drum D is such that during the braiding operation the cores C, C¹, C², etc., are elongated as illustrated, for example, at C⁴ (Fig. 11). The cores are held under tension while the jacket 5 is being braided about them, and preferably the tension thus applied to the cores is of the order of one-half to two-thirds that which is necessary to stretch the cores to the elastic limit of the rubber employed.

The braided jacket 5 as formed about these tensioned cores firmly grips them. When, after braiding, the tension on the composite strand is relaxed, the composite strand contracts, but the core rubber is held under a normal tension by the grip of the jacket which is between 15% and 25% (preferably approximately 20%) of that which is necessary to stretch the rubber to its elastic limit.

The braided jacket covers the successive cores C, C¹, C², etc., and also the connecting cords 14, the tapered windings 16 causing a gradual reduction in the diameter of the jacket in passing from the end of the core to the connecting cord 14.

Fig. 12 illustrates the appearance of the jacket where it covers the connecting cord 14, the jacket being of substantially less diameter where it embraces the cords 14 only than where it embraces the core. As above noted, the connecting cords 14 are of approximately double the length of the terminal, inelastic end portion of the shroud. After the jacket has been applied, as above described, the connection between two core portions of the jacket is severed midway between the ends of adjacent cores, as shown in Fig. 12 at the plane A—B, thus providing two separate terminal portions 4ª and 4ᵇ forming the terminals of adjacent shrouds. This severing of the connecting cord with its jacket may conveniently be done by means of a hot wire H, particularly if the jacket be formed of nylon or similar synthetic yarn. When nylon is employed, the severing of the covered cord by means of a hot wire fuses the fibers with which the hot wire contacts thereby positively uniting the casing to the terminal cord of the core, and also providing an end finish F (Fig. 13) which seals the end of the terminal portion of the shroud and prevents fraying.

While it is contemplated that silk may be employed in making the jacket or casing and also for the connecting cords 14, it is preferred to employ nylon for this purpose, because of the high elasticity of nylon which permits the braided jacket material to elongate structurally and elastically under load to a very substantial extent. On the other hand, since the rubber elastic cores are initially tensioned to an amount which is very substantially less than that necessary to elongate them to the elastic limit, the maximum elastic elongation of the nylon jacket is such that when the jacket has extended to the full amount, the rubber cores are still within their safe stretch limit.

As examples of appropriate materials; tensions to be applied during manufacture; and proportions of parts, the following examples are instanced with respect to shrouds designed to carry a riding load of 7 pounds and 11 pounds, respectively.

|  | Shroud | |
| --- | --- | --- |
|  | 7# Riding Load | 11# Riding Load |
| 1. Core | | |
| (a) Number of elastic threads | 24 | 36. |
| (b) Size of elastic threads | #24 | #24. |
| (c) Square or round threads | Square | Square. |
| (d) Material | Para | Para. |
| (e) Total elongation of a normal 2" length at elastic limit | 16½" | 16½". |
| (f) Actual elongation of a normal 2" length at the braiding point and tolerance. | 10¼" plus or minus ¼ | 10¼" plus or minus ¼. |
| (g) Pounds tension applied to the group of elastic threads | 10½ lbs | 15⅞ lbs. |
| (h) Whether ribbon rubber or beamed threads | Ribbon | Ribbon. |
| 2. Jacket | | |
| (a) Number of braiding carriers | 16 | 16. |
| (b) Size of yarn (denier) | 210 | 210. |
| (c) (1) filament | 3 denier | 3 denier. |
| (2) spun (length of staple fibers and twist) | continuous (drawn) | continuous (drawn). |
| (3) twisted—No. of Yarns | 7-ply, 2 ends up | 7-ply, 2 ends up. |
| Twist: | | |
| 1-ply | 2½ to 3S | 2½ to 3S. |
| 7-ply | 2½ to 3S | 2½ to 3S. |
| (d) Material | Nylon | Nylon. |
| (e) Total elongation of jacket-forming threads: | | |
| 1-ply | 18 to 22% | 18 to 22%. |
| 7-ply | 20 to 25% | 20 to 25%. |
| (f) Picks per inch: | | |
| terminal portion | 13¼ | 13¼. |
| elastic portion | 32 | 30. |
| (g) Tension (pounds) on jacket threads at braiding point | 0.016 spring [1] or 6 oz. weight on 2B carrier. | 0.016 spring or 6 oz. weight on 2B carrier. |
| (h) Total elongation of jacket alone: | | |
| measured at 300# tension | 22% | 22%. |
| measured at breaking point and tolerance | 30% plus or minus 5% | 30% plus or minus 5%. |
| 3. Test methods and results of tests | | |
| (a) Elongation of a normal 10" shroud at normal riding load | 19.3" | 20.2". |
| (b) Ultimate elongation of same length of shroud (at 360 lbs tension) | 27.3" | 24.7". |

[1] A "0.016 spring" is one made from spring wire of 0.016 inch in diameter.

Illustrative, approximate dimensional relationships of the above shrouds are as follows:

|  |  | 7# Line | 11# Line |
| --- | --- | --- | --- |
|  |  | Inches | Inches |
| 1 | Relaxed—Core—Unbraided Equivalent diameter (calculated) | .231 | .282 |
| 2 | Composite Cord—Relaxed Diameter (including jacket) | .262 | .273 |
| 3 | Thickness of Jacket (one side) | .034 | .034 |
| 4 | Diameter of Core (Calculated) when cord is relaxed | .194 | .205 |
| 5 | Diameter of Cord, overall at maximum elongation | .166 | .184 |
| 6 | Estimated thickness of jacket | .032 | .032 |
| 7 | Diameter of core within jacket at maximum elongation of cord | .102 | .120 |
| 8 | Diameter of core at approximately breaking point (calculated) | .069 | .084 |

Comparison of the above values (7 and 8) clearly shows the actual factor of safety inherent in shrouds embodying this invention.

In Figs. 14 and 15 the characteristic elongation of rubber-elastic cores made in accordance with the present invention is shown by way of example, Fig. 14 representing the stress-strain diagram for a 7-pound shroud, and Fig. 15 showing a similar diagram for an 11-pound shroud.

Fig. 16 shows the stress-strain diagrams for completed shrouds designed to sustain a 7-pound and 11-pound riding load respectively. Comparison of the diagrams of Figs. 14 and 15 with those of Fig. 16 shows the effect of the jacket. It may be noted that while the jacket materially lessens the elongation of the core for a given load, its effect is not pronounced until the core has elongated to form 200 to 240% and not until the shroud is sustaining a load as great as the intended riding load.

The following data relating to a shroud designed to sustain a five-pound riding load is given by way of further specific example:

|  | Shroud, five (5) pound riding load |
| --- | --- |
| 1. Core | |
| (a) Number of elastic threads | 15. |
| (b) Size of elastic threads | #24. |
| (c) Square or round threads | Square. |
| (d) Material | Para. |
| (e) Total elongation of a normal 2" length at elastic limit | 18". |
| (f) Actual elongation of a normal 2" length at braiding point | 10¼" plus and minus ¼". |
| (g) Pounds tension applied to the group of elastic threads | 5 pounds. |
| (h) Whether ribbon rubber or beamed threads | Beamed threads. |
| 2. Jacket | |
| (a) Number of braiding carriers | 16. |
| (b) Size of yarn | 210. |
| (c) (1) filament | 3 denier. |
| (2) spun or drawn | continuous (drawn). |
| (3) twisted number of yarns | 3-ply (3 ends up). |
| (d) Material | Nylon. |
| (e) Total elongation of jacket forming threads 1-ply | 18 to 22%. |
| (f) Picks per inch: | |
| terminal portion | 17. |
| elastic portion | 38. |
| (g) Tension on jacket threads at braiding point | .016 spring. |
| (h) (1) Relaxed—Core—Unbraided Equivalent diameter (Cal.) | .182". |
| (2) Composite Cord, Relaxed Dia. | .209. |
| (3) Thickness of jacket | .029. |
| (4) Diameter of Core (Calculated) when cord is relaxed | .151". |
| (5) Diameter of Cord, overall at maximum elongation | .129". |
| (6) Estimated thickness of jacket | .028". |
| (7) Diameter of Core within jacket at maximum elongation | .073. |
| (8) Diameter of Core at approximately breaking point (calculated) | .0543". |

After the jacket has been braided and the tension is relaxed, the composite strand contracts so that in the relaxed or "at rest" shroud the core is elongated approximately to double its original length. In thus contracting, the constituent threads of the braided jacket tend to assume positions more nearly perpendicular to the axis of the braid than during the braiding operation until they become so closely packed that further contraction is impossible, but the jacket still grips the core so firmly as to prevent independent contraction of the latter substantially. When the shroud is loaded, it is believed to respond substantially as follows: at first the rubber core contracts in diameter faster than the jacket, and the core elongates without substantial interference from the jacket. The expansion of the core under these conditions is shown in the diagram of Fig. 16 where, for the 7-pound shroud, for example, elongation between 120% and 240%, is substantially proportionate to the stress applied. During this period the jacket also elongates, but this elongation of the jacket is permitted by rearrangement of its constituent yarns which tend to dispose themselves more nearly parallel to the length of the length of the jacket as the jacket decreases in diameter. These substantially independent elongations of the core and jacket continue up to a point indicated in the diagram (Fig. 16) by the sudden downward bend in the curve. Beyond this point, the structure of the jacket does not permit its substantial further collapse in diameter, but before this point is reached the jacket again grips the core.

The casing or jacket is capable of elastic elongation, after structural elongation has nearly reached its maximum, in response to further application of loading stress. The elastic elongation is due in part to elastic stretch of the constituent filaments which make up the yarns, and in part to modification, in response to stress, of the twist imparted in preparing the individual yarns and in preparing the plied yarns employed. A braided nylon jacket or casing, when subjected to loading stress, thus elongates elastically approximately 30% (as compared with its length after structural elongation has substantially reached its maximum) before reaching the elastic limit. Thus, if through some unexpected circumstance, the load applied to the shroud is far in excess of that which is normally imposed by the sudden opening of the canopy, the elastic resistance to stretch of the jacket provides a factor of safety such as to prevent the shroud from breaking. Fig. 16 shows that the shroud continues elastically to elongate, but relatively slowly, far beyond the point of application of the intended riding load (7 or 11 pounds respectively), and the shroud is readily capable of elastic elongation in response to the suddenly applied load, due to the opening of the canopy (for instance of the order of 28 pounds per shroud), without rupture either of the jacket or of the core.

Expressed mathematically, the completed core, made as above described, appears to have elastic characteristics as follows: Assuming that the core alone is capable of elastic elongation $X$ at its elastic limit, it is normally elongated, in the relaxed shroud, by an amount $W$ which is less than $X$ but greater than zero. Preferably $W$ is of the order of approximately 20% of $X$. The casing alone (of an initial "at rest" length $M$) is capable of a structural elongation by reason of the rearrangement of its braided strands when subjected to tension, but without substantial elastic elongation of its constituent individual yarns. The casing is capable of an additional elongation $Z$ (approximately 30% of $M+Y$), by reason of the elasticity of its constituent yarns after its structural elongation $Y$ has ceased, for all practical purposes. The maximum elongation $Y+Z$ of the casing is substantially less than the maximum elongation $X$ of the core. When the shroud is subjected to load, the casing constitutes elastically stretchable limiting means for determining the maximum elongation of the shroud, but the core is sufficiently resistant to elongation to sustain the riding load at an elongation of the core much less than $X$, and with the shroud extended substantially less than $Y$. $X-(Y+Z)$ is the safety factor for the core. Expressed arithmetically elongation of the core at the time of highest possible shock load is $W+Y+Z$ and that elongation must be substantially less than $X$, and the difference between $(W+Y+Z)$ and $X$ is the safety factor applying to the rubber core.

While herein the core or core threads are referred to as of rubber, it is to be understood that the core or core threads may be of any other material, for instance, synthetic rubber, having substantially the stretch and elastic recovery characteristics of vulcanized natural rubber. Moreover, while nylon has been referred to as a desirable material for use in making the jacket or casing, any material having similar characteristics, particularly with reference to elastic stretch and recovery may be employed.

The size and amount of yarn used in any given case depends upon the ultimate breaking strength specified for the shroud to be made and their determination is within the common knowledge of those skilled in the art. Reducing the number of picks per inch in the braided jacket tends to produce a shroud of a shorter relaxed length and, conversely, increasing the number of picks per inch increases the relaxed length. The relaxed or no-load length of line is of concern only in maintaining uniformity for packing, but the stretched or riding load length is important since the proper functioning of the parachute is largely dependent upon the proper length of the lines.

While certain desirable materials and modes of procedure have herein been described and certain examples have been given as illustrative of the practice of the invention, it is to be understood that the invention is broadly inclusive of all such modifications in materials, proportions and procedures as fall within the scope of the appended claims.

We claim:

1. A parachute shroud comprising a braided jacket and a rubber-elastic core, the core comprising a bundle of substantially parallel elastic threads firmly bound together at opposite ends of the core, the jacket extending beyond opposite ends of the core to form attaching terminals, and a terminal cord firmly anchored to each end respectively of the core, each terminal cord being encased within the corresponding terminal portion of the jacket, the elastic threads being normally held stretched, intermediate said end bindings, by the grip of the jacket when the shroud is unloaded, the normal elongation of the core threads being less than their elongation when the shroud is supporting the riding load.

2. A parachute shroud comprising a braided jacket, a rubber-elastic core and relatively inelastic terminal cords united, respectively, to the opposite ends of the core, the jacket covering the core and both terminal cords, the jacket and terminal cords being of nylon and the yarns at the free ends of the jacket and terminal cords being fused together.

3. A parachute shroud comprising a braided jacket and a rubber-elastic core, the core comprising a bundle of parallel rubber-elastic threads, a tensioned elastic binding for each end of the bundle, a relatively inelastic cord passing through the bundle adjacent to the inner end of each binding, each cord being looped to provide parallel runs disposed at diametrically opposite sides of each respective binding, and an elastic wrapping embracing each end binding and constrictively securing the cord to the end of the core, each end wrapping tapering in diameter, and the jacket covering the core and both terminal cords.

4. A parachute shroud comprising a braided jacket, a rubber-elastic core and relatively inelastic terminal cords united, respectively, to the opposite ends of the core, the jacket covering the core and both terminal cords, the jacket and terminal cords being of nylon, the yarns at the free ends of the jacket and terminal cords being fused together, and the core threads being held tensioned and elongated to approximately double their initial length by the embracing grip of the jacket when the shroud is unloaded.

5. An elastic core for making parachute shrouds, said core comprising a bundle of parallel rubber-elastic threads and a tensioned rubber-elastic thread wrapping the parallel threads at each end of the bundle, thereby constrictively uniting them.

6. An elastic core for making parachute shrouds, said core comprising a bundle of parallel rubber-elastic threads and a tensioned rubber-elastic thread wrapping the parallel threads at each end of the bundle, thereby constrictively uniting them, the normal or relaxed length of the bundle of threads, between said end bindings, being sufficient to constitute an elastically stretchable core for a single shroud.

7. As a stage product in the manufacture of elastic parachute shrouds, a core strand consisting of a series of elongate rubber-elastic cores alternating with substantially inelastic connecting elements, each connecting element being of a length substantially twice the desired length of the terminal portion of a shroud, the cores being of rubber and the connecting elements being of substantially smaller normal diameter than the cores.

8. A parachute shroud comprising a normally elongate, elastically stretchable core consisting of a plurality of substantially parallel rubber-elastic threads, substantially inextensible terminal cords, each securely anchored to one end of the core, and a stretchable tubular braided casing for the core, the casing extending beyond the opposite ends of the core to encase each of the respective terminal cords, the casing being capable of substantial structural elongation and the core being capable of an elongation of several hundred per cent. beyond the elongation which it has in the relaxed shroud, the casing being capable, as the core is elongated more than a predetermined per cent., of elongating elastically to a substantial degree, the upper limit of the elastic elongation of the casing being less than that of the core so that the casing constitutes limiting means for determining the maximum possible elongation of the shroud when subjected to the suddenly applied load resultant from opening the parachute, the core being sufficiently resistant to elongation to sustain the riding load without assistance from the casing.

9. A parachute shroud comprising a core consisting of a plurality of substantially parallel rubber-elastic threads, the several rubber-elastic threads being bound together at opposite ends of the core, a tubular braided jacket for the core, the several rubber-elastic threads of the core being under a normal tension of substantially the same predetermined amount, the jacket consisting of interbraided threads of nylon, substantially inextensible terminal cords of nylon secured to the opposite ends of the core, the braided jacket also embracing the terminal cords, the constituent threads of the jacket and terminal cords being fused together at the ends of the shroud, thereby positively anchoring the core to the jacket.

10. A parachute shroud comprising a core of elastically stretchable material and a tubular braided casing for the core, the casing consisting of interbraided yarns having substantially the elastic characteristics of nylon, the core being capable of an elastic elongation of $X$ at its elastic limit and being elongated, in the relaxed shroud, by an amount $W$ which is much less than $X$ and greater than zero, the casing being capable of a structural elongation of $Y$, from an initial length $M$, without substantial elastic elongation of its constituent yarns and being capable of additional elongation $Z$ by reason of the elasticity of its constituent yarns after it has been extended to the length $Y$, the maximum elongation $Y+Z$ of the casing being less than the maximum elongation $X$ of the core, whereby the casing constitutes elastically stretchable limiting means for determining the maximum elongation of the shroud when subjected to overload, the core being sufficiently resistant to elongation to sustain the riding load at an elongation less than $X$ and with the shroud extended substantially less than $Y$.

11. An elastic parachute shroud having a core consisting of parallel elastically stretchable rubber threads of a size of the order of No. 24, and a stretchable tubular braided casing for the core, the casing extending beyond each end of the core to provide an attaching terminal, the core consisting of interbraided nylon yarns and being capable of elongation to an extent less than the elongation of the core when the latter is stretched to the elastic limit, the maximum elongation of the casing thus determining the maximum elongation of the shroud when subjected to the suddenly applied load resultant from opening of the parachute, and a substantially inextensible terminal cord firmly anchored to each end of the core respectively, each terminal cord being encased by the corresponding attaching terminal cord of the casing, the core threads being elongated, in the unloaded shroud, to approximately 20% of their elongation at their elastic limit, and the core being sufficiently resistant to elongation to absorb a large proportion of said suddenly applied load and to sustain the riding load with the shroud extended to a length intermediate its normal unstressed length and its aforesaid maximum elongation.

12. That method of making elastically stretchable parachute shrouds which comprises as steps preparing rubber-elastic core units each of a length appropriate for use in making a single parachute shroud, connecting a plurality of said core units in series by means of relatively inelastic cords, subjecting the connected series of core units to tension, and, while maintaining said tension, encasing them, with the connecting cords, in a tightly braided jacket.

13. That method of making elastically stretchable parachute shrouds which comprises as steps preparing rubber-elastic core units each of a length appropriate for use in making a single parachute shroud, connecting a plurality of said core units in series by means of substantially inelastic cords, subjecting the connected series of core units to tension such as to stretch them to an amount not substantially exceeding 20% of their elongation at the elastic limit, and, while holding the core units thus stretched, braiding a jacket about them.

14. That method of making elastically stretchable parachute shrouds which comprises as steps preparing rubber-elastic core units each of a length appropriate for use in making a single parachute shroud, connecting a plurality of said core units in series by means of relatively inelastic cords, subjecting the consequent series of core units to tension such as to elongate each unit to at least double its initial length but less than its maximum elongation at the elastic limit of the constituent rubber threads, and braiding a jacket of textile yarns about the core units and their connecting cords.

15. That method of making elastically stretchable parachute shrouds which comprises as steps preparing rubber-elastic core units each of a length appropriate for use in making a single parachute shroud, connecting a plurality of said core units in series by means of relatively inelastic cords, subjecting the connected series of core units to tension such as to elongate each unit to at least one-half its maximum elongation at the elastic limit of the constituent rubber threads, and braiding a jacket of nylon yarns about the extended core units and their connecting cords and permitting the composite strand to relax.

16. That method of making elastically stretchable parachute shrouds which comprises as steps preparing rubber-elastic core units each of a length appropriate for use in making a single parachute shroud, connecting a plurality of said core units in series by means of substantially inextensible cords, subjecting each core unit of the series to tension such as to elongate it to from one-half to two-thirds of its maximum elongation at the elastic limit of the constituent threads, braiding a jacket of nylon yarn about the extended core units and their connecting cords, severing the jacket and the connecting cords at points approximately mid-way between the ends of adjacent core units, and fusing the nylon yarns of the jacket at the points of severence.

17. That method of making elastically stretchable parachute shrouds which comprises as steps preparing rubber-elastic core units each of a length appropriate for use in making a single parachute shroud by disposing in substantially parallel relation a plurality of rubber-elastic core threads, in number sufficient to constitute a desired core, tensioning the core threads, and applying to the tensioned core threads elastic constrictive bindings at intervals spaced apart a distance which, after the core unit has been permitted to relax, is substantially equal to the length of the desired core unit.

18. That method of making elastically stretchable parachute shrouds which comprises as steps preparing rubber-elastic core units each of a length appropriate for use in making a single parachute shroud by disposing in substantially parallel relation a plurality of rubber-elastic core threads in number sufficient to constitute the desired core and of a length to form several core units, tensioning the core threads and binding tightly together the several core threads with wrappings of tensioned rubber-elastic thread, the several wrappings being spaced apart a distance, after the core unit has been permitted to relax, a distance approximating the length of the desired core unit for a single shroud.

19. That method of making elastically stretchable parachute shrouds which comprises as steps preparing rubber-elastic core units each of a length appropriate for use in making a single parachute shroud by disposing in substantially parallel relation a plurality of rubber-elastic core threads in number sufficient to constitute the desired core and of a length to form several core units, equally tensioning the several core threads, and binding together the several threads with wrappings of tensioned elastic thread, successive wrappings being spaced apart a distance, after the core unit has been permitted to relax, approximating the length of the core unit for a single shroud, each wrapping comprising a pair of spaced, independent servings of the rubber-elastic binding thread.

20. That method of making elastically stretchable parachute shrouds which comprises as steps preparing rubber-elastic core units by disposing in substantially parallel relation a plurality of rubber-elastic core threads in number sufficient to constitute the desired core and of a length to form several core units, equally tensioning the several core threads and binding together the several threads with wrappings of tensioned elastic thread, successive wrappings being spaced apart a distance, when the core unit is relaxed, approximating the length of a core unit for a single shroud, each wrapping comprising two independent servings of the rubber-elastic thread spaced apart a distance approximately one-eighth inch when the core threads are relaxed.

21. That method of making elastically stretchable parachute shrouds which comprises as steps preparing rubber-elastic core units by disposing in substantially parallel relation a plurality of rubber-elastic core threads in number sufficient to constitute the desired core and of a length to form several core units, equally tensioning the several core threads, applying to the tensioned core threads elastic constrictive bindings at intervals spaced apart a distance which, after the core has been permitted to relax, is substantially equal to the length of the desired core unit, each binding consisting of two independent parts spaced a distance of the order of one-half of an inch, and thereafter severing the parallel core threads at points intermediate the spaced, independent parts of each respective binding, thereby to provide elastically stretchable core units each having its constituent threads bound tightly together at its opposite ends.

22. That method of making elastically stretchable parachute shrouds which comprises as steps providing rubber-elastic core units each of a length appropriate for use in making a single parachute shroud, each unit comprising a bundle of substantially parallel rubber-elastic threads and each unit having a constrictive binding at its opposite ends, uniting said core units in series by looping a relatively inelastic cord transversely through the bundle of core threads of adjacent units, at points inwardly of and adjacent to their end bindings, uniting the ends of each of said cords, constrictively binding the legs of each cord loop to the respective end bindings, and encasing the connected series of units with their connecting cords in a tubular braid.

23. That method of making elastically stretchable parachute shrouds which comprises as steps preparing rubber-elastic core units by disposing rubber-elastic threads in parallel relation, tensioning the core threads and applying constrictive bindings to the tensioned threads at distances apart such that, after the core threads have been permitted to relax, the bindings are spaced approximately the length of the desired unit, severing the core threads at the locations of the several bindings, thereby to provide core units each having a binding at each end, dividing the core threads at each end of the unit into two substantially equal groups, passing a connecting cord between said groups and arranging it to form a loop whose legs are parallel to the end binding of the unit, and constrictively securing the legs of the loop to said end binding.

24. That method of making elastically stretchable parachute shrouds which comprises as steps preparing rubber-elastic core units by disposing rubber-elastic threads in parallel relation, tensioning the core threads and applying constrictive bindings to the tensioned threads at distances apart such that, after the core threads have been permitted to relax, adjacent bindings are spaced approximately the length of the desired unit, severing the core threads at the locations of the several bindings, thereby to provide core units each having a binding at each end, dividing the core threads at each end of the unit into two substantially equal groups, passing a connecting cord between said groups and arranging the cord to form a loop whose legs are parallel to the end binding of the unit, and wrapping a tensioned rubber-elastic thread about the parallel legs of the loop about the end binding, thereby to anchor the cord to the bound end of the core unit.

25. That method of making elastically stretchable parachute shrouds which comprises as steps preparing rubber-elastic core units by disposing rubber-elastic threads in parallel relation, tensioning the core threads and applying constrictive bindings to the tensioned threads at distances apart such that, after the core threads have been permitted to relax, the bindings are spaced approximately the length of the desired unit, severing the core threads at the locations of the several bindings, thereby to provide core units each having a binding at each end, dividing the core threads at each end of the unit into two substantially equal groups, passing a substantially inextensible connecting cord between said groups and arranging the cord to form a loop whose legs are parallel to the end binding of the unit, and applying an elastically constrictive casing to the parallel legs of the cord loop and to the end binding, said constrictive casing tapering in diameter, its smaller end embracing the legs of the loop alone.

26. That method of making elastically stretchable parachute shrouds which comprises as steps preparing rubber-elastic core units by disposing rubber-elastic threads in parallel relation, tensioning the core threads and applying a constrictive binding to the tensioned threads, severing the core threads at the locations of the binding thereby to provide a core unit having a binding at its end, dividing the core threads at the bound end of the unit into two substantially equal groups, passing a connecting cord between said groups and arranging the cord to form a loop whose legs are parallel to the end binding of the unit, and wrapping a tensioned rubber-elastic thread about the parallel legs of the cord loop and about the end binding, said wrapping extending beyond the end of the binding and tapering in diameter, its smaller end embracing the legs of the loop only.

27. That method of making elastically stretchable parachute shrouds which comprises as steps preparing rubber-elastic core units by disposing a plurality of rubber-elastic core threads in substantially parallel relation, binding the tensioned threads together at distances apart approximately such that after the core threads have been permitted to relax the bindings are spaced apart the length of the desired unit, each binding comprising two independent wrappings of tensioned rubber-thread spaced apart a distance of the order of one-eighth inch, severing the core threads between the wrappings of each binding thereby providing independent core units, separating the core threads of each unit adjacent to its end bindings into two groups each of substantially the same number of threads, passing a cord between the two groups at the approximate ends of two adjacent core units, uniting the ends of the cord at a point intermediate the end of the adjacent units, and wrapping the legs of the cord loops where they lie parallel to the end bindings of the respective adjacent units with servings of rubber-elastic thread to form constrictive casings for said end bindings and for the legs of the cord loops adjacent to said bindings.

28. That method of making elastically stretchable parachute shrouds which comprises as steps preparing a rubber-elastic core by marking a substantially relaxed rubber-elastic core strand at regularly spaced intervals, tensioning the strand while encasing it in a braided jacket, and adjusting the tension during braiding by reference to the spacing of said marks, thereby to insure a uniform per cent elongation of the strand, and braiding tensioned textile yarn to form a jacket which tightly embraces the core.

29. That method of making elastically stretchable parachute shrouds which comprises as steps preparing a rubber-elastic core by disposing substantially relaxed rubber-elastic core threads in substantially parallel relation, marking one at least of said threads at regularly spaced intervals, applying tension to elongate the several threads while encasing them in a braided jacket, and adjusting the tension during braiding so as to maintain a substantially uniform spacing of said marks during the braiding operation, and braiding tensioned textile yarns to form the jacket about the core.

ROBERT T. DAWES.
FRANK TAYLOR.

REFERENCES CITED

The following references are of record in the file of this patent:

UNITED STATES PATENTS

| Number | Name | Date |
|---|---|---|
| 487,042 | Ziegler | Nov. 29, 1892 |
| 1,619,342 | Gammeter | Mar. 1, 1927 |
| 2,422,440 | Severance | June 17, 1947 |